(12) United States Patent
Masumoto et al.

(10) Patent No.: US 11,451,293 B2
(45) Date of Patent: Sep. 20, 2022

(54) OPTICAL TRANSMISSION SYSTEM AND UNUSED CHANNEL VERIFICATION METHOD

(71) Applicant: Nippon Telegraph and Telephone Corporation, Tokyo (JP)

(72) Inventors: Kana Masumoto, Tokyo (JP); Toshiya Matsuda, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/291,520

(22) PCT Filed: Oct. 30, 2019

(86) PCT No.: PCT/JP2019/042647
§ 371 (c)(1),
(2) Date: May 5, 2021

(87) PCT Pub. No.: WO2020/100599
PCT Pub. Date: May 22, 2020

(65) Prior Publication Data
US 2022/0006522 A1    Jan. 6, 2022

(30) Foreign Application Priority Data

Nov. 13, 2018 (JP) .............................. JP2018-212702

(51) Int. Cl.
*H04B 10/073* (2013.01)
*H04B 10/50* (2013.01)
(Continued)

(52) U.S. Cl.
CPC ......... *H04B 10/073* (2013.01); *H04B 10/503* (2013.01); *H04B 10/40* (2013.01); *H04B 10/43* (2013.01); *H04B 10/60* (2013.01)

(58) Field of Classification Search
None
See application file for complete search history.

(56) References Cited

U.S. PATENT DOCUMENTS

| 6,118,566 A * | 9/2000 | Price .................. H04B 10/2507 398/1 |
| 2004/0017965 A1 * | 1/2004 | Abe ..................... H04B 10/035 385/24 |

(Continued)

OTHER PUBLICATIONS

[No Author Listed], "Optical Fiber Classifier," Furukawa Electric Co., Ltd., 2018, 5 pages (with English Translation).

*Primary Examiner* — Darren E Wolf
(74) *Attorney, Agent, or Firm* — Fish & Richardson P.C.

(57) ABSTRACT

An unused path through which actual data is not transmitted in a long-distance redundant network can be appropriately detect, and this function is realized at low cost. A transmission unit 33 of optical transceivers 21a and 21b connected to each other by an optical fiber cable 22 in an optical transmission system 20 includes a laser 37 for emitting a laser beam serving as an optical signal P1 to the optical fiber cable 22, and an optical intensity control unit 35 for performing control to change the optical level of the optical signal of the laser beam. Each of the optical transceivers 21a and 21b includes a control unit 31 for superimposing each of an idle signal A1, an OAM signal O1, and an actual data signal D1 on an XGMII signal 31s and outputting this XGMII signal 31s to the transmission unit 33 that transmits the optical signal P1, and a signal determination unit 32 for determining unique information regarding each signal output to the transmission unit 33 and outputting a determination result signal 32s. The optical intensity control unit 35 performs control to change the optical level of the optical signal P1 on which a signal of the determination of each signal indicated by the determination result signal 32s is (Continued)

superimposed to different optical levels L1 to L3 between the signals.

6 Claims, 8 Drawing Sheets

(51) Int. Cl.
    *H04B 10/60* (2013.01)
    *H04B 10/40* (2013.01)
    *H04B 10/43* (2013.01)

(56) References Cited

U.S. PATENT DOCUMENTS

2011/0268435 A1* 11/2011 Mizutani ............... H04L 45/28
    398/5
2015/0098317 A1* 4/2015 Cheung ............... H04L 45/28
    370/218

* cited by examiner

OPTICAL TRANSMISSION SYSTEM AND UNUSED CHANNEL VERIFICATION METHOD

CROSS-REFERENCE TO RELATED APPLICATIONS

This application is a National Stage application under 35 U.S.C. § 371 of International Application No. PCT/JP2019/042647, having an International Filing Date of Oct. 30, 2019, which claims priority to Japanese Application Serial No. 2018-212702, filed on Nov. 13, 2018. The disclosure of the prior application is considered part of the disclosure of this application, and is incorporated in its entirety into this application.

TECHNICAL FIELD

The present invention relates to an optical transmission system and a method for checking an unused path for appropriately checking an unused path in a redundant network that includes a plurality of path to reach a destination node.

BACKGROUND ART

Conventionally, in a redundant network of an optical transmission system, long-distance communication is performed to which a common optical communication method is applied, and an OAM (Operation Administration and Maintenance: maintenance and monitoring function) signal that is superimposed on an optical signal is transmitted at a fixed period, regardless of whether or not actual data superimposed on the optical signal is transmitted. The optical signal is responsible for transmission of various data, such as actual data and the OAM signal.

This redundant network will be described with reference to a redundant network 10A with a configuration shown in FIG. 6. In the redundant network 10A, a transmission source node 11 that transmits data and a destination node 12 that is a destination of this data are connected to each other via a first path 14 and a second path 15 via routers 13a and 13b that are disposed on the respective node 11 and 12 sides, respectively. The first and second paths 14 and 15 are constituted by optical fiber cables (also referred to as optical fibers). The transmission source node 11 is connected to the router 13a, and the router 13b is connected to the destination node 12, by the optical fibers. The transmission source node 11 and the destination node 12 are optical transceivers that transmit and receive optical signals.

An actual data signal D1, which has been transmitted while being superimposed on an optical signal from the transmission source node 11, is transmitted through the first path 14 between the nodes 11 and 12, and this path (first path 14) through which the actual data signal D1 is transmitted will be referred to as a used path. The path (second path 15) through which the actual data signal D1 is not transmitted will be referred to as an unused path. The OAM signal is transmitted at a fixed period through both the used path and the unused path.

In this communication state, if a node 16, such as a transponder or a router, needs to be added to the first path 14 that is currently in use, as shown by a broken-line frame in FIG. 7, the used path is switched to the second path 15 (FIG. 6), which is currently the unused path, to transmit the actual data signal D1. Thereafter, the first path 14, which has been the used path, is switched to the unused path. The OAM signal is transmitted to both the switched used path and unused path in the same manner as above.

Next, an operation to add the node 16 to the first path 14, which has been switched to the unused path, is performed. At this time, since the first path 14 is in a conductive state, a connector of the first path 14 needs to be pulled out from the router 13b. However, a large number of optical fibers serving as paths are connected to the router 13b via the connector.

Then, if an operator pulls out a connector of the second path 15 that is currently the used path by mistake, as indicated by a "x" sign in FIG. 8, the second path 15 is switched to a non-conductive, stopped state. To prevent such a mistake, measures are taken; e.g. optical fiber cables are tagged or identified by the cable color, but still human error occurs.

There is a technique for appropriately detecting an unused path without error, using an optical fiber identifier described in NPL 1. This is called an optical fiber identification technique, and identification light that has a different wavelength from the aforementioned optical signal and has been subjected to low-speed modulation (which will be described later) is transmitted from a light transmitter to an optical fiber that is the unused path for which the operation is performed. An optical fiber cable through which this optical signal is transmitted is held from two sides by the optical fiber identifier to bend the optical fiber cable, and the identification light is detected by detecting leakage light generated due to the bending, using the optical fiber identifier. The unused path can be detected by detecting this identification light.

Note that the identification light is transmitted by providing an optical transmitter with the following function. That is to say, the optical transmitter has a function of transmitting the identification light when detecting a state where actual data is not being transmitted with the actual data superimposed on the optical signal, i.e. an idle state that is a null-data state.

Since the aforementioned leakage light has low power (e.g. −80 dBm at the minimum), it needs to be distinguished from noise, and thus, it is common to impart low-speed modulation to the identification light by means of low-speed on-off modulation. The optical fiber identifier is constituted by an optical fiber cable bending unit and an identification light detection unit. The amount by which an optical fiber cable is bent by the bending unit is designed in a range that does not give the optical signal adverse influence, such as signal loss. To increase the amount of leakage light generated due to the bending, the identification light has a wavelength on a long wavelength side relative to the optical signal.

CITATION LIST

Patent Literature

[NPL 1] Furukawa Electric Co., Ltd. "Optical Fiber Identifier", [online], 2018, [Searched on Oct. 27, 2018], Internet <URL: https://www.furukawa.co.jp/common/images/1footer/logo group.svg>

SUMMARY OF THE INVENTION

Technical Problem

However, there is the following problem in the optical fiber identification technique that uses the optical fiber identifier described in NPL 1 above. The optical signal is usually transmitted with a wavelength near the wavelength with the least light loss. In addition, since identification light is introduced that is an optical signal with a wavelength on the long wavelength side relative to the optical signal, identification light in the L-band (1565 nm to 1625 nm) is used with respect to the optical signal that is in the C-band (1530 nm to 1565 nm).

To transmit optical signals with these two different wavelengths, a relay amplifier cannot be used for the optical fiber. If the relay amplifier cannot be used, only short-distance communication can be performed, and thus, the above optical fiber identification technique cannot be used in a long-distance optical transmission system. Moreover, two optical transmitters for the optical signal and the identification light are needed, resulting higher cost.

Meanwhile, there may be cases where the actual data signal D1 intermittently flows through the used path, with the idle state interposed. In this case, if the idle-state part is relatively long, the optical fiber identifier may detect a used path as the unused path since the idle state is detected and the identification light is transmitted.

The present invention has been made in view of the foregoing situation, and an object of the present invention is to provide an optical transmission system and a method for checking an unused path that enable an unused path through which actual data is not transmitted to be appropriately detected in a long-distance redundant network, and that can realize this function at low cost.

Means for Solving the Problem

As a means for solving the above-described problem, the invention according to claim 1 is an optical transmission system that includes a plurality of optical transmission paths through which an OAM signal for maintenance and monitoring is transmitted while being superimposed on an optical signal, the optical transmission paths connecting optical transceivers, each of which has a transmission unit for transmitting the optical signal and a receiving unit for receiving the optical signal, to each other, the optical transmission paths including a used path through which an actual data signal from a communication terminal device connected to any of the optical transceivers is transmitted while being superimposed on the optical signal and through which an idle signal in an empty data state that is interposed between intermittent actual data signals is transmitted while being superimposed on the optical signal, and an unused path through which the actual data signal is not transmitted and the idle signal is transmitted, the transmission unit of each of the optical transceivers including: a laser for emitting a laser beam serving as the optical signal; and an optical intensity control unit for performing control to change an optical level of the optical signal of the laser beam from the laser, each of the optical transceivers including: a control unit for superimposing each of the idle signal, the OAM signal, and the actual data signal on an interface signal for absorbing a difference in communication media and outputting the interface signal to the transmission unit that transmits the optical signal; and a signal determination unit for determining unique information regarding each of the signals output to the transmission unit, and outputting a determination result signal regarding this determination, wherein the optical intensity control unit performs control, in accordance with a determination state of each signal indicated by the determination result signal, to change the optical level of the optical signal on which a signal of the determination state is superimposed to different levels between signals.

The invention according to claim 4 is a method for checking an unused path in an optical transmission system that includes a plurality of optical transmission paths through which an OAM signal for maintenance and monitoring is transmitted while being superimposed on an optical signal, the optical transmission paths connecting optical transceivers, each of which has a transmission unit for transmitting the optical signal and a receiving unit for receiving the optical signal, to each other, the optical transmission paths including a used path through which an actual data signal from a communication terminal device connected to any of the optical transceivers is transmitted while being superimposed on the optical signal and through which an idle signal in an empty data state that is interposed between intermittent actual data signals is transmitted while being superimposed on the optical signal, and an unused path through which the actual data signal is not transmitted and the idle signal is transmitted, the transmission unit of each of the optical transceivers including: a laser for emitting a laser beam serving as the optical signal; and an optical intensity control unit for performing control to change an optical level of the optical signal of the laser beam from the laser, each of the optical transceivers executing: a step of superimposing each of the idle signal, the OAM signal, and the actual data signal on an interface signal for absorbing a difference in communication media and outputting the interface signal to the transmission unit that transmits the optical signal; and a step of determining unique information regarding each of the signals output to the transmission unit, and outputting a determination result signal regarding this determination, and the optical intensity control unit executing: a step of performing control, in accordance with a determination state of each signal indicated by the determination result signal, to change the optical level of the optical signal on which a signal of the determination state is superimposed to different levels between signals.

According to the configuration in claim 1 and the method in claim 4, the optical levels of the idle signal, the OAM signal, and the actual data signal, which are superimposed on the optical signal transmitted through an optical transmission path, are made different between the signals. If these optical levels are detected by a detector capable of detecting the optical level from outside the optical transmission path, the signals can be appropriately detected, and it is therefore possible to appropriately detect that the optical transmission path is the used path or the unused path.

The optical transceivers, which can make the optical level different between the signals, can be configured by using a microprocessor of a common optical transceiver as the signal determination unit, and the transmission unit that includes the laser and the optical intensity control unit is mounted in common optical transceivers. Accordingly, the optical transceivers do not need additional circuits, additional devices, or the like. In addition, since no change is made to already-installed optical fibers, reinstallation or rewiring is not needed. Accordingly, the configuration for detecting the unused path of the present invention can be realized at low cost.

Furthermore, optical signals with two different wavelengths need not be transmitted to detect the unused path as in the conventional technique, and only an optical signal with one wavelength is needed in the present invention. For this reason, a relay amplifier can be used, and the unused path can be detected even in a long-distance optical transmission path. Accordingly, a function of detecting the unused path through which the actual data signal is not transmitted in a long-distance redundant optical transmission path (redundant network) can be realized at low cost.

Accordingly, the unused path through which actual data is not transmitted in a long-distance redundant network can be appropriately detected, and this function can be realized at low cost.

The invention according to claim 2 is the optical transmission system according to claim 1 further including a detector for detecting the optical level of the optical signal that is transmitted through any of the optical transmission paths and on which the idle signal is superimposed to detect the idle signal, and detecting that the optical transmission path is the unused path if a detection time for the idle signal is longer than or equal to a predetermined idle determination time.

According to this configuration, it can be appropriately detected that an optical transmission path is the unused path.

The invention according to claim 3 is the optical transmission system according to claim 2 wherein the detector detects that the optical transmission path is the used path if the detection time for the idle signal is shorter than the idle determination time.

According to this configuration, the following effects are obtained. First, it is assumed that, in the case where the detector only has a function of only detecting the unused path as in claim 2 above, measurement to detect the used path has been performed. In this case, a measurer can determine that an optical transmission path is a used path only when detection of the unused path is impossible over a long period of time. However, in claim 3, it can be detected that an optical transmission path is the used path if the detection time for the idle signal is shorter than the idle determination time, and therefore, the measurer can determine that an optical transmission path is the used path in a short time, and the operation efficiency can be improved. That is to say, when it is unknown whether an optical transmission path is the used path or the unused path, the used path can be determined in a short time.

Effects of the Invention

According to the present invention, an optical transmission system and a method for checking an unused path can be provided that enable an unused path through which actual data is not transmitted in a long-distance redundant network to be appropriately detected and that realizes this function at low cost.

DESCRIPTION OF EMBODIMENTS

Figure 1:
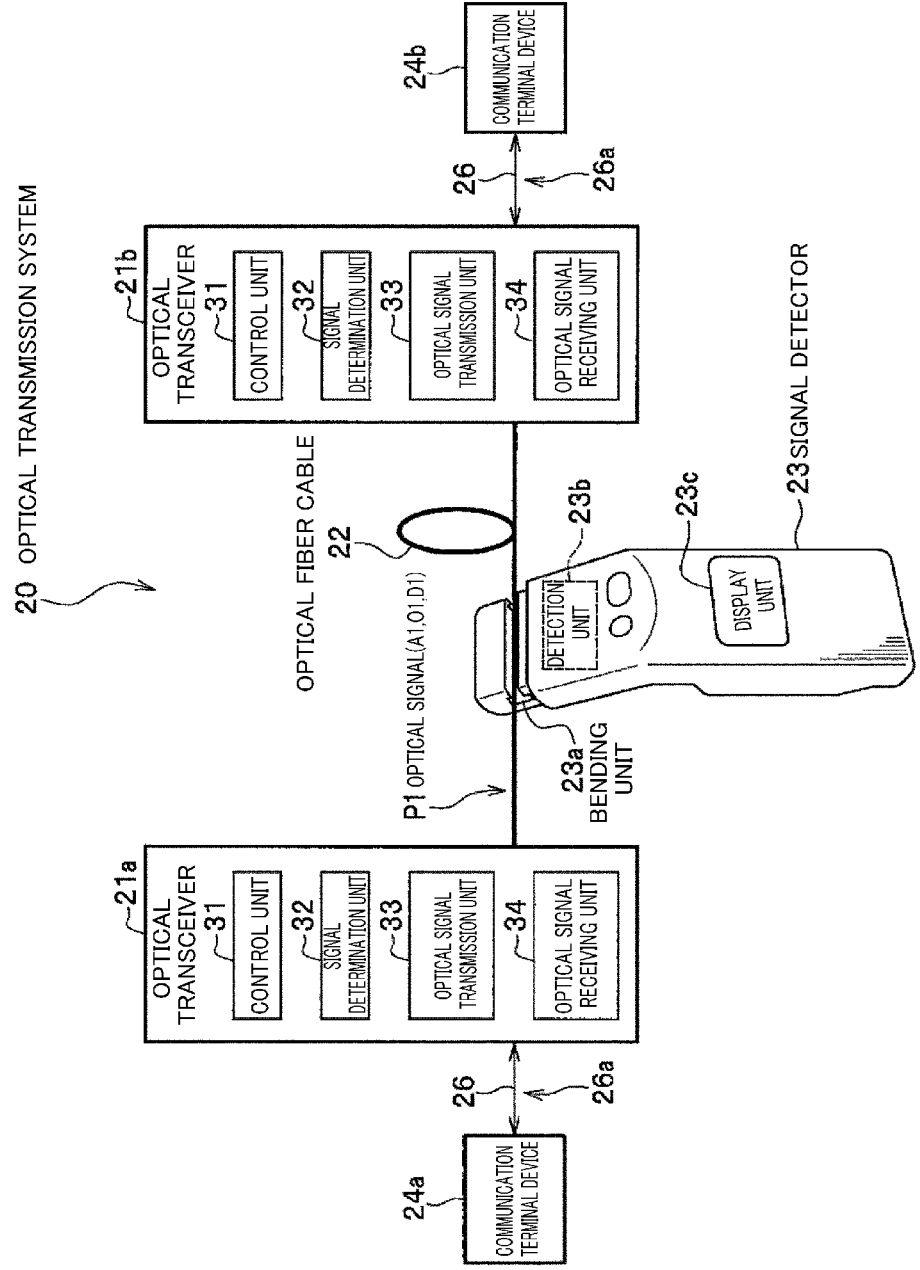
FIG. 1 is a block diagram showing a configuration of an optical transmission system according to an embodiment of the present invention.

Hereinafter, an embodiment of the present invention will be described with reference to the drawings. However, constituent portions with corresponding functions are assigned the same reference numerals in all diagrams of the present specification, and descriptions thereof are omitted as appropriate.

Configuration of Embodiment

FIG. 1 is a block diagram showing a configuration of an optical transmission system according to an embodiment of the present invention.

An optical transmission system 20 shown in FIG. 1 includes optical transceivers 21a and 21b that are separately disposed on respective sides at remote locations, an optical fiber cable 22 (also referred to as an optical fiber 22) that connects these optical transceivers 21a and 21b, and communication terminal devices 24a and 24b such as personal computers that are connected to the respective optical transceivers 21a and 21b provided on the respective sides. Furthermore, the optical transmission system 20 includes a signal detector (detector) 23 that separately detects an idle signal A1, an OAM signal O1, and an actual data signal D1, which are transmitted through the optical fiber 22 while being separately superimposed on an optical signal P1.

Figure 6:
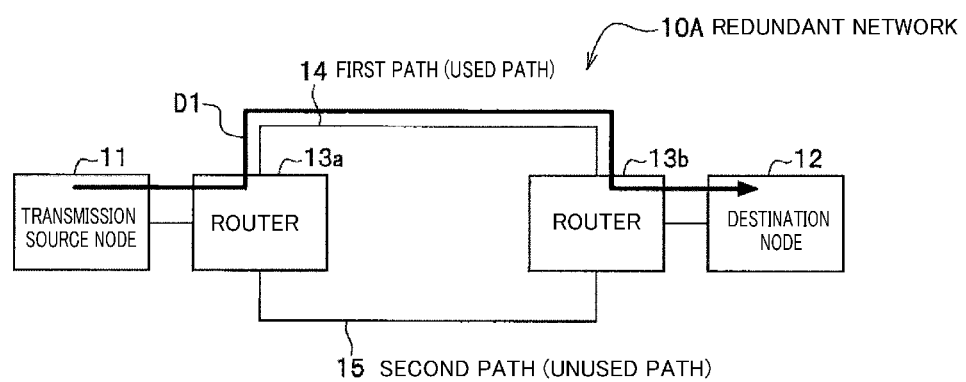
FIG. 6 is a diagram showing a configuration in the case where a first path in a redundant network in a conventional optical transmission system is a used path, and a second path is an unused path.
Figure 7:
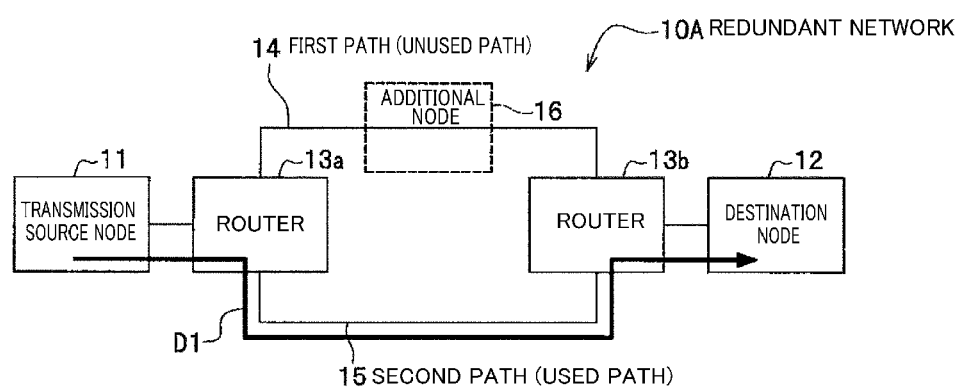
FIG. 7 is a diagram showing the configuration in the case where the first path in a redundant network in the conventional optical transmission system is an unused path, and the second path is a used path.
Figure 8:
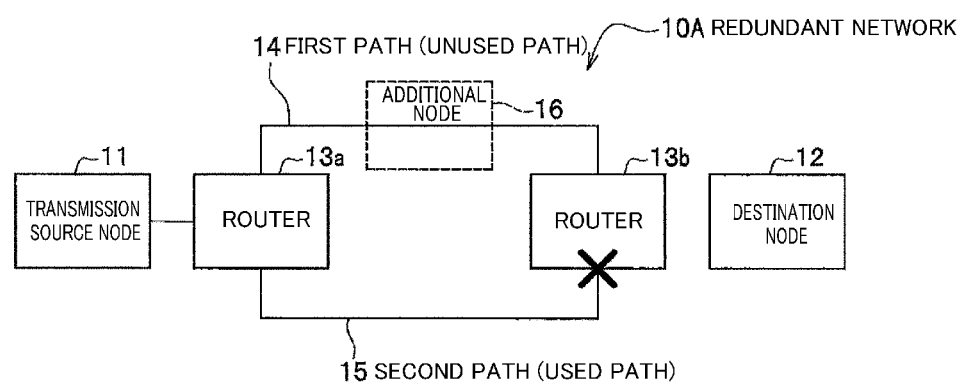
FIG. 8 is a diagram showing a configuration in the case where the first path in the redundant network in the conventional optical transmission system is an unused path, and the second path is a used path, and in the case where a connector of the used path is pulled out.

However, although FIG. 1 shows only one optical fiber 22 between the optical transceivers 21a and 21b, it is assumed that a redundant network configuration is employed here, as shown in FIG. 6 mentioned above. The redundant network is preferably a PtoP (Peer to Peer) network that includes one-to-one network connection between nodes.

One optical transceiver 21a and the communication terminal device 24a are connected to each other by an Ethernet (registered trademark) cable 26, and exchange Ethernet frame signals 26a. The other optical transceiver 21b and the communication terminal device 24b are also connected to each other similarly by an Ethernet cable 26.

Each of the optical transceivers 21a and 21b includes a control unit 31, a signal determination unit 32, an optical signal transmission unit (which is also referred to as a transmission unit) 33, and an optical signal receiving unit (which is also referred to as a receiving unit) 34.

The control unit 31 performs control to separately superimpose each of the idle signal A1, the OAM signal O1, and the actual data signal D1 on a later-described XGMII signal 31s (see FIG. 2).

The actual data signal D1 is a signal that includes the Ethernet frame signals 26a received from the communication terminal devices 24a and 24b, and is transmitted, after being superimposed on the XGMII signal 31s (described later), from the transmission unit 33 to the aforementioned used path (see FIG. 6) of the optical fiber 22.

The idle signal A1 is an empty-data signal that does not contain actual data, and is transmitted through an unused path (see FIG. 6) to which the actual data signal D1 is not being transmitted. Each actual data signal D1 is transmitted while being interposed between actual data signals D1 that are intermittently transmitted through the used path.

The signal determination unit 32 determines unique information regarding each of the idle signal A1, the OAM signal O1, and the actual data signal D1 that are superimposed on the XGMII signal 31s (described later) and output to the transmission unit 33, and outputs a determination result signal 32s (see FIG. 2) that indicates the determination result to the transmission unit 33.

The transmission unit 33 sets the optical level of the optical signal P1 in accordance with the determination result signal 32s, and transmits the optical signal P1 with the set optical level to the optical fiber 22.

Next, a specific example of the optical transceivers 21a and 21b will be described, with the optical transceiver 21a representatively shown in FIG. 2. The optical transceiver 21a shown in FIG. 2 is configured based on a common SFP (Small Form-Factor Pluggable) transceiver, and includes a protocol IC (Integrated Circuit) unit 31 that has the function of the above-described control unit 31, a signal determination unit 32, a serial-parallel conversion unit (which is also referred to as an SP conversion unit 36) 36, and the aforementioned transmission unit 33 and receiving unit 34.

The protocol IC unit 31 includes a MAC (Media Access Control) sub-layer unit 31a and a PHY (physical layer) unit 31b.

The MAC sub-layer unit 31a controls transmission and reception between the communication terminal devices 24a and 24b, which support Ethernet, using a MAC address with a transmission source and a destination.

The MAC sub-layer unit 31a performs processing for data exchange with the PHY unit 31b, and performs processing to absorb a difference in communication media at the physical layer and the subsequent layers. This MAC sub-layer 31a is connected to the PHY unit 31b by an interface such as XGMII (10 Gigabit Media Independent Interface), which is defined by IEEE802.3z, and can be connected to the optical fiber 22, which is a network, via the PHY unit 31b, the SP conversion unit 36, the transmission unit 33, and the receiving unit 34.

Each of the aforementioned idle signal A1, OAM signal O1, and actual data signal D1 is separately superimposed on the XGMII signal 31s, which is exchanged between the MAC sub-layer unit 31a and the PHY unit 31b. Each of the superimposed signals is converted from a parallel signal PL to a serial signal SL by the SP conversion unit 36 that is connected between the transmission unit 33 and the PHY unit 31b. Note that the XGMII signal 31s constitutes an interface signal for absorbing a difference in communication media described in the claims.

The SP conversion unit 36 also converts a serial signal SL from the transmission unit 33 to a parallel signal PL. Although the serial signal SL between the SP conversion unit 36 and the transmission unit 33 is indicated by a double arrow in FIG. 2, this double arrow also expresses that the serial signal SL deriving from the optical signal P1 received by the receiving unit 34 is output to the SP conversion unit 36.

The PHY (physical layer) unit 31b is a type of protocol that pertains to the most physical position in the OSI (Open System Interconnection) reference model in the network. In the PHY unit 31b, the physical content such as the shape of the interface and the data transmission method is defined. For example, the shape of a connector, the mode of voltage and wavelength used to convert electrical signals, and so on, are defined. The PHY is also provided with a function of transmitting and receiving electrical signals and scrambling data.

The PHY unit 31b outputs the idle signal A1, the OAM signal O1, and the actual data signal D1 that are separately superimposed on the XGMII signal 31s from the MAC sub-layer unit 35a, to the transmission unit 33 via the SP conversion unit 36.

However, the OAM signal O1 is commonly transmitted at a period (which will be referred to as an OAM period T1) of any of 3.3 ms, 10 ms, 100 ms, 10 s, 1 m, and 10 m. Note that the OAM period T1 may also be a period other than the above-listed periods.

The signal determination unit 32 is constituted by a microprocessor mounted in a common SFP transceiver, and has the following characteristic configurations of the present invention.

As a first characteristic configuration, a TD_snoop_Pin (transmitted data monitoring pin) 32a of the microprocessor is connected to a signal line between the SP conversion unit 36 and the transmission unit 33, and the idle signal A1, the OAM signal O1, and the actual data signal D1 (which are also referred to as transmission signals A1, O1, and D1) that flow as serial signals SL are input to this signal line. The TD_snoop_Pin 32a is also referred to as a TD pin 32a.

As a second characteristic configuration, an AUX_mod_Pin (sub-modulation signal pin) 32b for signal output (out) of the signal determination unit 32 is connected to an AUX_mod_Pin 33a for signal input (in) that is standardly provided in the transmission unit 33, and the later-described determination result signal 32s flows through these pins. The AUX_mod_Pin 32b is also referred to as an output pin 32b, and the AUX_mod_Pin 33a is also referred to as an input pin 33a.

The transmission unit 33 includes an optical intensity control unit 35 and a laser 37, which are commonly provided. The laser 37 emits a laser beam, which is the optical signal P1, to the optical fiber 22. The optical intensity control unit 35 is connected to the input pin 33a, and performs later-described control.

The signal determination unit 32 separately determines unique information regarding the idle signal A1, the OAM signal O1, and the actual data signal D1 shown in FIG. 3(a) that are input from the TD pin 32A, and outputs the determination result signal 32s that indicates the determination result from the output pin 32b to the input pin 33a.

When determining unique information regarding each signal, the signal determination unit 32 performs the determination using a determination signal J1 shown in FIG. 3(b). This determination signal J1 is a strobe signal that is generated at a fixed period (e.g. at a period of 3.7 ms) for signal determination in the signal determination unit 32. The determination signal J1 can also be input from outside the signal determination unit 32.

The signal determination unit 32 expresses, using the determination result signal 32s, the results of the determination made using the determination signal J1, by three types of determination states, namely OFF, ON, and OA, which is an intermediate level between OFF and ON, as shown in FIG. 3(c).

The determination result signal 32s is ON if the signal determination unit 32 determines that the unique information indicates the idle signal A1, OA if the signal determination unit 32 determines that the unique information indicates the OAM signal O1, and OFF if the signal determination unit 32 determines that the actual data signal D1 determines that the unique information indicates the actual data signal D1. The determination result signal 32s that indicates any of these determination results is output from the output pin 32b shown in FIG. 2, input to the input pin 33a, and is supplied to the optical intensity control unit 35.

The optical intensity control unit 35 performs control to change the optical intensity (optical level) of the laser beam (optical signal P1) emitted from the laser 37, by controlling an injection current of the laser 37 in accordance with the determined state indicating any of the transmission signals A1, O1, and D1 indicated by the determination result signal 32s. That is to say, the optical intensity control unit 35 performs control to change the optical level of the optical signal P1.

That is to say, the optical intensity control unit 35 sets the optical level of the optical signal P1 to L1 if the determination result signal 32s is in the ON state indicating the idle signal A1, as shown in FIG. 3(d), sets the optical level to L2, which is a level higher than the optical level L1, if the determination result signal 32s is in the OA state indicating the OAM signal O1, and sets the optical level to L3, which is a level higher than the optical level L2, if the determination result signal 32s is in the OFF state indicating the actual data signal D1. The optical levels L1 to L3 are optical intensities that do not adversely affect transmission using the optical fiber 22.

This intensity modulation control for the optical signal P1 may also be performed in accordance with the signal indicated by the determination result signal 32s by providing a VOC (Variable Optical Attenuator), which is not shown in the figure, on the output side of the laser 37.

Here, if the optical fiber 22 is a concentration network, inconvenience may occur such as collision between any of the idle signal A1, the OAM signal O1, and the actual data signal D1 and signals on the other path. In the present embodiment, however, the optical fiber 22 is a PtoP network that includes one-to-one network connection between nodes, and thus there is no concern that the aforementioned inconvenience will occur.

Next, the signal detector 23 shown in FIG. 1 is configured based on the aforementioned optical fiber identifier, and includes a bending unit 23a, a detection unit 23b, and a display unit 23c.

The bending unit 23a bends the optical fiber cable 22 inserted into a groove in the bending unit 23a, and cause leakage light to be generated. The amount of bending is designed in a range that does not give the optical signal P1 with adverse influence such as signal loss.

The detection unit 23b detects the transmission signals A1, O1, and D1 by detecting leakage light corresponding to the optical levels L1 to L3 of the transmission signals A1, O1, and D1 that are superimposed on the aforementioned optical signal P1. At this time, the detection unit 23b detects that the optical fiber 22 is the unused path when detecting the idle signal A1 for a predetermined time period (which will be referred to as an idle determination time) or more as a result of detecting leakage light of the idle signal A1. Also, the detection unit 23b detects that the optical fiber 22 is the used path when detecting the idle signal A1 that is shorter than the idle determination time. However, it is a prerequisite condition that the idle signal A1 does not flow through the used path for the idle determination time or more.

The display unit 23c displays that the signals have been detected, displays that the optical fiber 22 is the unused path when the idle signal A1 that is longer than or equal to the idle determination time has been detected by the detection unit 23b, and displays that the optical fiber 22 is the used path when the idle signal A1 that is shorter than the idle determination time has been detected.

Figure 4:
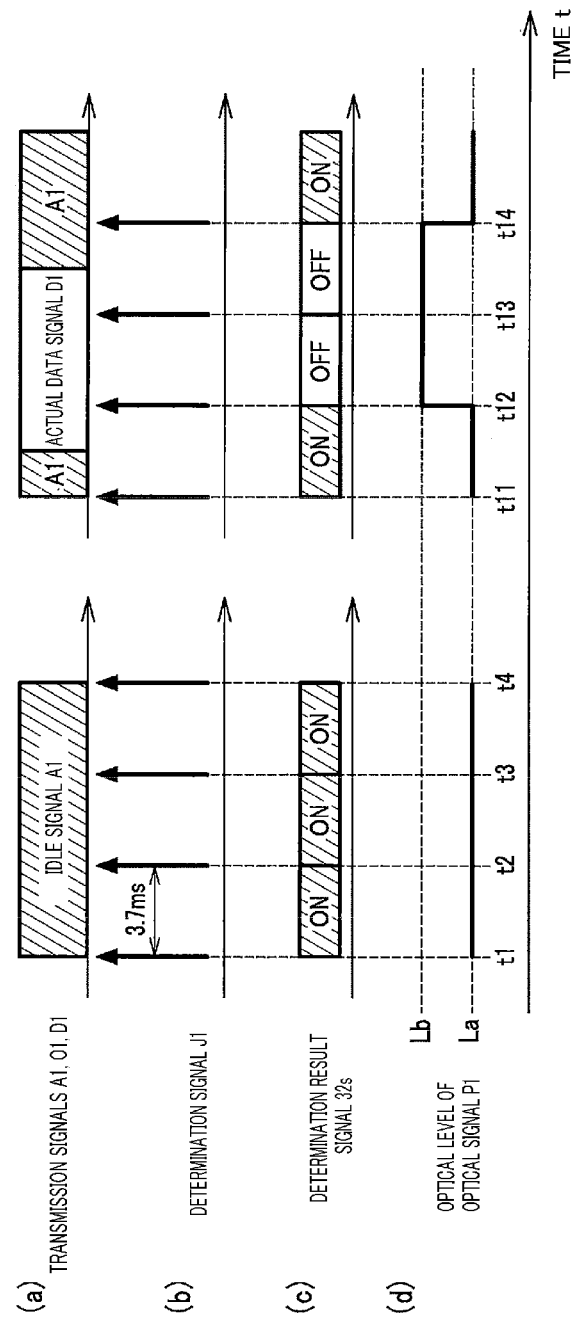
FIG. 4 shows a timing chart indicating timings of two-step optical levels of (a) transmission signals, which are the idle signal A1 and the actual data signal D1, (b) the determination signal, (c) the determination result signal, and (d) the optical signal in the optical transmission system in the present embodiment.

Here, the case is assumed where the actual data signal D1 and the idle signal A1 are separately detected by the signal detector 23 when the actual data signal D1 is intermittently transmitted through one optical fiber 22, with the idle signal A1 interposed. This detection operation will be described with reference to FIG. 4.

FIG. 4(a) shows the idle signal A1 and the actual data signal D1 serving as transmission signals that are transmitted while being superimposed on the XGMII signal 35s. FIG. 4(b) shows the determination signal J1, and FIG. 4(c) indicates the determination result signal 32s. FIG. 4(d) shows an optical level La of the optical signal P1, and an optical level Lb that is an optical intensity higher than the optical level La. The optical level La is a level corresponding to the idle signal A1, and the optical level Lb is a level corresponding to the actual data signal D1.

It is assumed that the idle signal A1 is transmitted from the time t1 to the time t4 and input to the TD pin 32a of the signal determination unit 32, as shown in FIG. 4(a). In this case, the signal determination unit 32 determines the input signal using the determination signal J1, as shown in FIG. 4(b).

If the determination result indicates the idle signal A1, the signal determination unit 32 switches the determination result signal 32s to the ON state, and outputs this determination result signal 32s from the output pin 32b, as shown in FIG. 4(c). The output determination result signal 32s is input from the input pin 33a of the transmission unit 33, and is supplied to the optical intensity control unit 35.

Since the determination result signal 32s is ON indicating the idle signal A1, the optical intensity control unit 35 sets the optical level of the optical signal P1 of the laser beam emitted by the laser 37 to La, as shown from the time t1 to the time t4 in FIG. 4(d).

Next, it is assumed that, after the idle signal A1 is input at the time t11, the actual data signal D1 is input from a point past the time t11 to a point past the time t13, and thereafter the idle signal A1 is input at a point past the time t13, as shown in FIG. 4(a).

In this case, based on the determination using the determination signal J1 shown in FIG. 4(b), the determination result signal 32s is in the ON state due to the idle signal A1 from the time t11 to the time t12, as shown in FIG. 4(c). Further, the determination result signal 32s is in the OFF state due to the actual data signal D1 from the time t12 to time t14, and is in the ON state due to the idle signal A1 at the time t14.

The optical intensity control unit 35 sets the optical level of the optical signal P1 to La from the time t11 to the time t12, to Lb from the time t12 to the time t14, and to La at the time t14, as shown in FIG. 4(d), in accordance with the above determination result signal 32s that is in the ON or OFF state.

The signal detector 23 detects leakage light corresponding to different optical levels La and Lb of the optical signal P1 from the time t11 to the time t14, and detects the idle signal A1 and the actual data signal D1.

In contrast, it is assumed that the OAM signal O1 is input to the TD pin 32a of the signal determination unit 32 at a period of 3.3 ms with intermittent idle signals A1 interposed, as indicated from the time t1 to the time t4 in FIG. 5(a), and the OAM signal O1 is input at a period of 10 ms, as indicated from the time t11 to a point past the time t13.

In this case, the determination result signal 32s shown in FIG. 5(c) is in the OFF state due to the OAM signal O1 from the time t1 to the time t2, and is in the ON state due to the idle signal A1 from the time t2 to the time t4, in accordance with the determination using the determination signal J1 from the time t1 to the time t4 shown in FIG. 5(b).

The optical intensity control unit 35 sets the optical level of the optical signal P1 to Lb from the time t1 to t2, and to La from the time t2 to the time t4, as shown in FIG. 5(d), in accordance with the determination results obtained from the time t1 to the time t4.

Also, from the time t11 to a point past the time t13, i.e. after 10 ms past from the time t11, the determination result signal 32s is in the OFF state due to the OAM signal O1 that is 10 ms long from the time t11 to the time t14, as shown in FIG. 5(c), in accordance with the determination result. The optical intensity control unit 35 sets the optical level of the optical signal P1 to Lb from the time t11 to the time t14, as shown in FIG. 5(d), in accordance with the OFF state.

Figure 5:
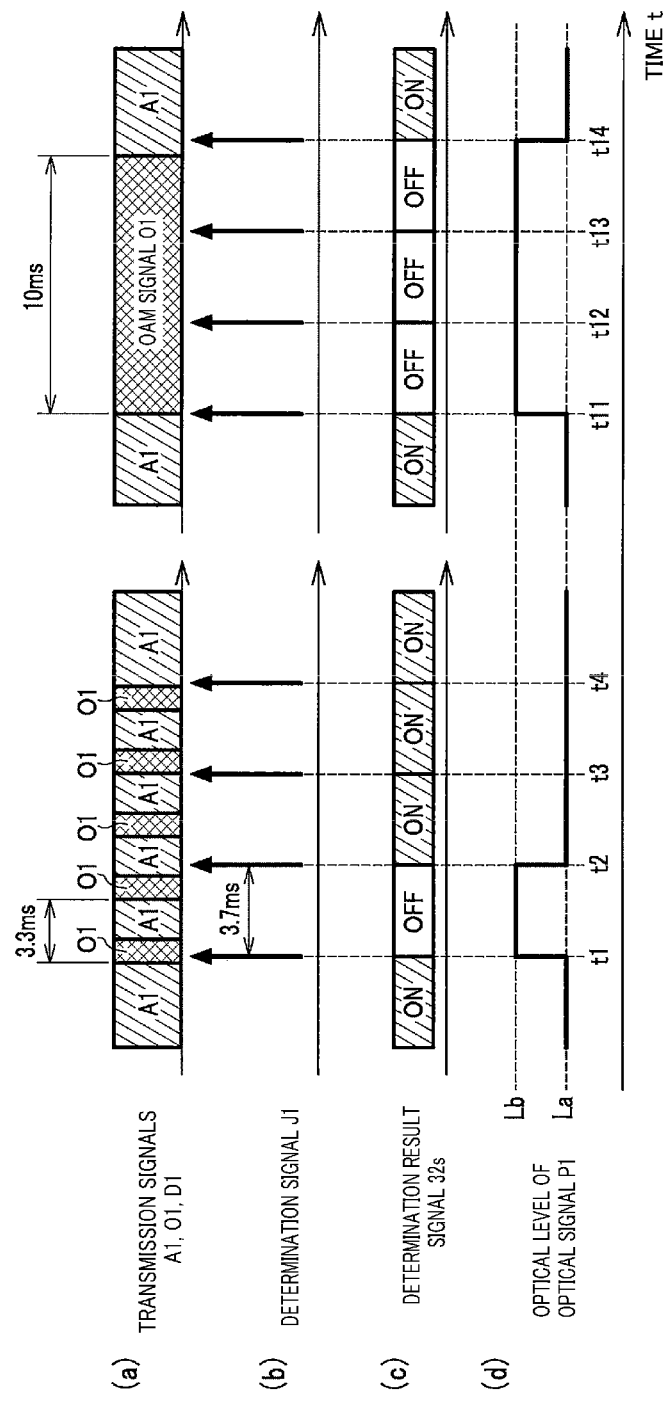
FIG. 5 shows a timing chart indicating timings of two-step optical levels of (a) transmission signals, which are the idle signal A1 and the OAM signal O1, (b) the determination signal, (c) the determination result signal, and (d) the optical signal in the optical transmission system in the present embodiment.

In the case shown in FIG. 5, the idle signal A1 is detected based on the optical level La, and the OAM signal O1 is detected based on the optical level Lb. For this reason, the detection of the OAM signal O1 based on the optical level Lb overlaps the detection of the actual data signal D1 based on the optical level Lb shown in FIG. 4, and, whether a transmission signal is the actual data signal D1 or the OAM signal O1 cannot be determined.

Operations in Embodiment

Figure 2:
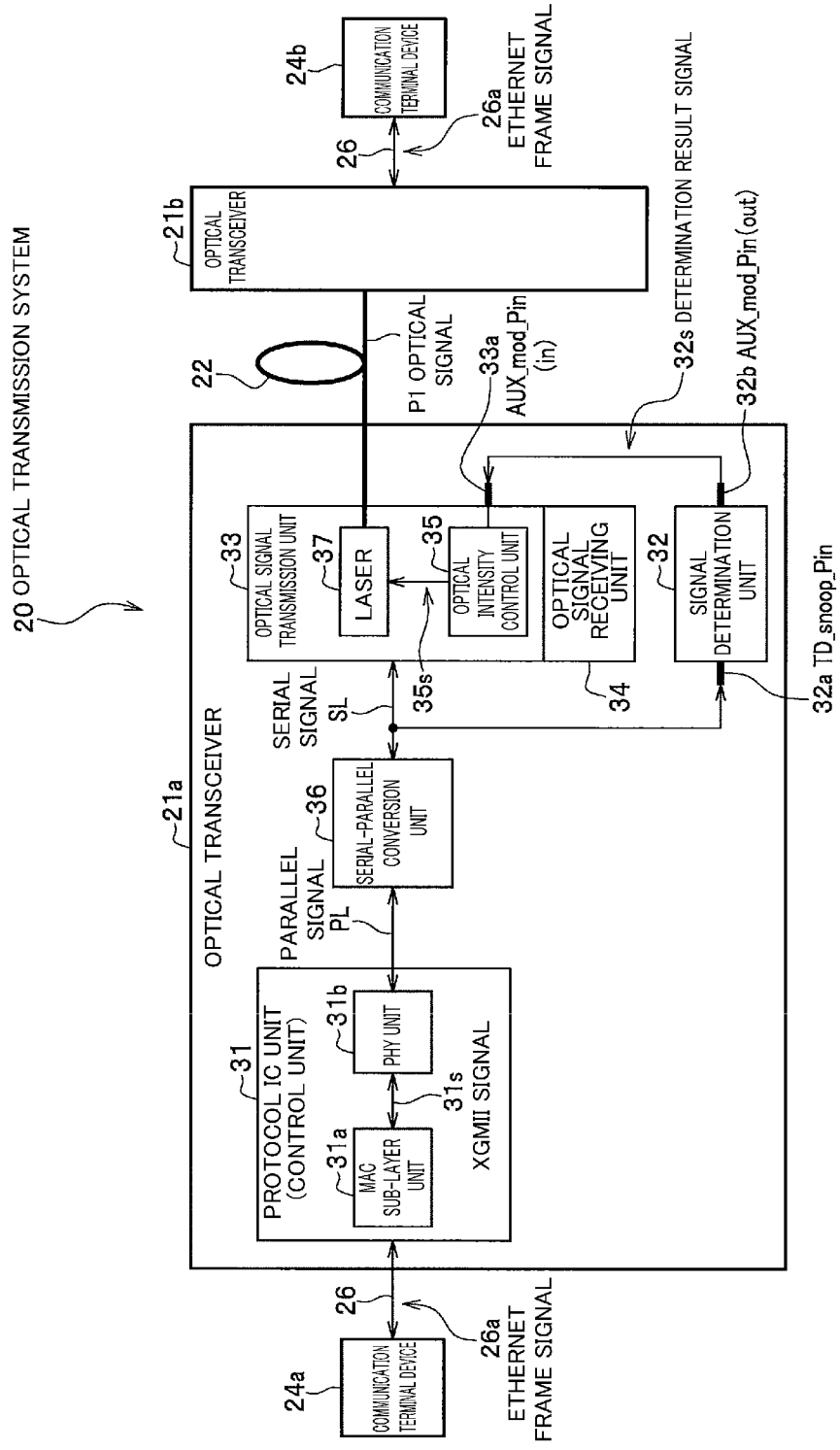
FIG. 2 is a diagram showing a specific example of a configuration of an optical transceiver in the optical transmission system in the present embodiment.
Figure 3:
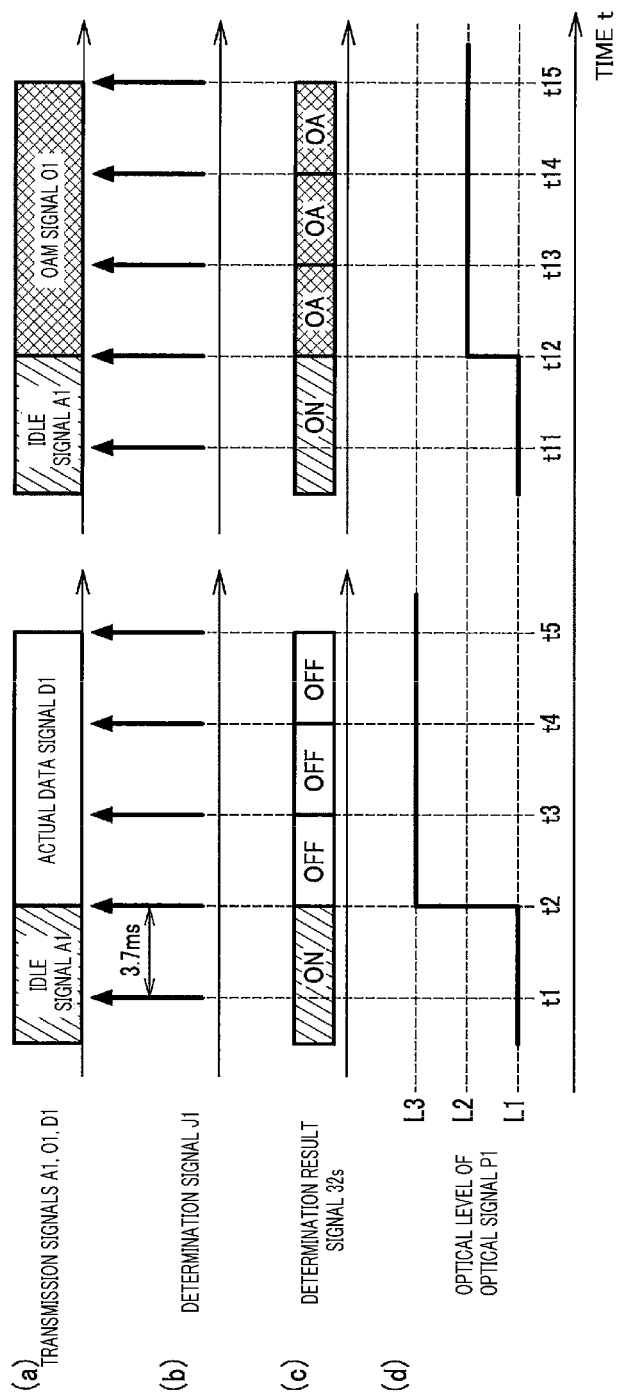
FIG. 3 shows a timing chart indicating timings of three steps of (a) transmission signals, which are an idle signal A1, an OAM signal O1, and an actual data signal D1, (b) a determination signal, (c) a determination result signal, and (d) an optical signal in the optical transmission system in the present embodiment.

Therefore, in the present embodiment, the optical signal P1, on which the idle signal A1, the OAM signal O1, and the actual data signal D1 are separately superimposed, is expressed at three stages, namely the optical levels L1 to L3, as shown in FIG. 3(d), such that distinction can be made. This operation will be described with reference to FIGS. 2 and 3.

First, the MAC sub-layer unit 31a shown in FIG. 2 superimposes the actual data signal D1 on the XGMII signal 35s in accordance with the Ethernet frame signal 26a received from the communication terminal device 24a. Furthermore, the MAC sub-layer unit 31a transmits the signal to the transmission unit 33 via the PHY unit 31b and the SP conversion unit 36. At a timing different from this transmission, the MAC sub-layer unit 35a superimposes the idle signal A1 or the OAM signal O1 on the XGMII signal 31s, and transmits the signal to the transmission unit 33 via the PHY unit 31b and the SP conversion unit 36.

Each of the idle signal A1, the OAM signal O1, and the actual data signal D1 transmitted to the transmission unit 33 is also input to the signal determination unit 32 via the TD pin 32a at the same time. That is to say, the transmission signals A1, O1, and D1 are input to the signal determination unit 32, as indicated from the time t1 to the time t5 and from the time t11 to the time t15 in FIG. 3(a).

First, the signal determination unit 32 determines unique information regarding the signals using the determination signal J1 shown in FIG. 3(b) from the time t1 to the time t5. If the determination result indicates the idle signal A1 shown from the time t1 to the time t2, the determination result signal 32s is switched to the ON state as shown in FIG. 3(c). If the determination result indicates the actual data signal D1 shown from the time t2 to the time t5, the determination result signal 32s is switched to the OFF state. This determination result signal 32s is output from the output pin 32b of the signal determination unit 32, and is supplied to the optical intensity control unit 35 via the input pin 33a of the transmission unit 33.

If the determination result signal 32s is ON indicating the idle signal A1, the optical intensity control unit 35 sets the optical level of the optical signal P1 of the laser beam emitted by the laser 37 to L1, as shown from the time t1 to the time t2 in FIG. 3(d). If the determination result signal 32s is OFF indicating the actual data signal D1, the optical intensity control unit 35 sets the optical level of the optical signal P1 to L3, as shown from the time t2 to the time t5.

Next, from the time t11 to the time t15, if the result of determining each signal using the determination signal J1 shown in FIG. 3(b) indicates the idle signal A1 shown from the time t11 to the time t12, the signal determination unit 32 switches the determination result signal 32s to the ON state, as shown in FIG. 3(c). If the determination result indicates the OAM signal O1 shown from the time t12 to the time t15, the signal determination unit 32 switches the determination result signal 32s to the OA state. The determination result signal 32s is output from the output pin 32b of the signal determination unit 32, and is supplied to the optical intensity control unit 35 via the input pin 33a of the transmission unit 33.

If the determination result signal 32s is ON indicating the idle signal A1, the optical intensity control unit 35 sets the optical level of the optical signal P1 to L1, as shown from the time t11 to the time t12 in FIG. 4(d). If the determination result signal 32s is OA indicating the OAM signal O1, the optical intensity control unit 35 sets the optical level of the optical signal P1 to L2, as shown from the time t12 to the time t15.

Thus, by employing the three-stage optical levels, namely L1 to L3, from the time t1 to t5 and from the time t11 to the time t15, the signals can be separately detected even when the actual data signal D1 is intermittently transmitted with the idle signal A1 interposed through the used path, and the OAM signal O1 is also transmitted.

If the optical fiber 22 is the used path, the idle signal A1 that is transmitted while being interposed between the intermittent actual data signals D1 is only transmitted for a shorter period than the idle determination time, as described in the aforementioned prerequisite condition. For this reason, the signal detector 23 detects that the optical fiber 22 is the used path when detecting an idle signal A1 that is shorter than the idle determination time.

On the other hand, in the unused path, the actual data signal D1 is not transmitted, and only the idle signal A1 and the OAM signal O1 are transmitted. Thus, since the idle signal A1 is transmitted for a longer period than the idle signal determination time, the signal detector 23 detects that the optical fiber cable 22 is the unused path when detecting the idle signal A1 that is longer than or equal to the idle determination time.

The display unit 23c displays that the signals have been detected. At this time, the display unit 23c displays that the optical fiber cable 22 is the unused path when the idle signal A1 that is longer than or equal to the idle determination time has been detected, and displays that the optical fiber cable 22 is the used path when the idle signal A1 that is shorter than the idle determination time has been detected.

<Effects of Embodiment>

Effects of the optical transmission system 20 according to the present embodiment will be described. The optical transmission system 20 connects the optical transceivers 21a and 21b, each of which has the transmission unit 33 and the receiving unit 34 for transmitting and receiving the optical signal P1, to each other. Furthermore, the optical transmission system 20 has a plurality of optical fiber cables 22 through which a pulsed OAM signal O1 for maintenance and monitoring is transmitted while being superimposed on the optical signal P1. These optical fibers 22 include the used path and the unused path. The used path refers to a path through which the actual data signals D1 from the communication terminal devices 24a and 24b connected respectively to the optical transceivers 21a and 21b are transmitted while being superposed on the optical signal P1, and through which the idle signal A1 in an empty data state that is interposed between intermittent actual data signals D1 is transmitted while being superposed on the optical signal P1. The unused path refers to a path through which the actual data signal D1 is not transmitted and the idle signal A1 is transmitted. This optical transmission system 20 has the following characteristic configuration.

(1) The transmission unit 33 includes the laser 37 that emits a laser beam serving as the optical signal P1, and the optical intensity control unit 35 that performs control to change the optical level of the optical signal of the laser beam from the laser 37. Each optical transceiver includes the control unit 31 and the signal determination unit 32. The control unit 31 superimposes each of the idle signal A1, the OAM signal O1, and the actual data signal D1 on an interface signal for absorbing the difference in communication media, and outputs this interface signal to the transmission unit 33 that transmits the optical signal P1. The signal determination unit 32 separately determines unique information regarding each signal output to the transmission unit 33, and outputs the determination result signal 32s regarding this determination. The optical intensity control unit 35 is configured to perform control, in accordance with the determination state of each signal indicated by the determination result signal 32s, to change the optical level of the optical signal P1 on which a signal of the determination state is superimposed to different levels (optical levels L1 to L3) between signals.

With this configuration, the optical level of each of the idle signal A1, the OAM signal O1, and the actual data signal D1, which are superimposed on the optical signal P1 transmitted through an optical fiber cable 22, is changed to different levels L1 to L3 between the signals. If the optical levels L1 to L3 are detected by the signal detector 23 capable of detecting the optical level from outside the optical fiber cable 22, each signal can be appropriately detected, and thus whether the optical fiber cable 22 is the used path or the unused path can be appropriately detected.

The optical transceivers 21a and 21b that enable the optical level of each signal to be changed to different optical levels L1 to L3 can be configured by using a microprocessor of a common optical transceiver as the signal determination unit 32. Also, the transmission unit 33 that includes the laser 37 and the optical intensity control unit 35 is mounted in common optical transceivers. For this reason, the optical transceivers 21a and 21b do not need additional circuits, additional devices, or the like. Also, no change is made to already-installed optical fiber cables 22, and thus reinstallation or rewiring is not needed. Accordingly, the configuration for detecting the unused path of the present invention can be realized at low cost.

Furthermore, optical signals with two different wavelengths are not transmitted to detect an unused path as in the conventional technique, and only the optical signal P1 with one wavelength is needed in the present invention. For this reason, a relay amplifier can be used, and the unused path can be detected even in the case of a long-distance optical fiber cable 22. Accordingly, a function of detecting the unused path through which the actual data signal D1 is not transmitted in a long-distance redundant optical fiber cable 22 (redundant network) can be realized at low cost.

Accordingly, the unused path through which actual data is not transmitted in a long-distance redundant network can be appropriately detected, and this function can be realized at low cost.

(2) The signal detector 23 has a configuration with the following characteristics. The signal detector 23 detects the optical levels L1 to L3 of the optical signal P1 that is transmitted through the optical fiber cable 22 and on which the idle signal A1 is superimposed, and detects this idle signal A1. Furthermore, the signal detector 23 detects that an optical fiber cable 22 is the unused path if this detection time is longer than or equal to the predetermined idle determination time.

According to this configuration, it can be appropriately detected that an optical fiber cable 22 is the unused path.

(3) The signal detector 23 is configured to detect that an optical fiber cable 22 is the used path if the detection time for the idle signal A1 is shorter than the idle determination time.

According to this configuration, the following effects are obtained. First, it is assumed that, in the case where the signal detector 23 only has a function of only detecting the unused path, as in (2) above, measurement to detect the used path has been performed. In this case, a measurer can determine that an optical fiber cable is the used path only when detection of the unused path is impossible over a long period of time. However, the signal detector 23 described in (3) can detect that an optical fiber cable is the used path if the detection time for the idle signal A1 is shorter than the idle determination time, and thus the measurer can determine, in a short time, that an optical fiber cable is the used path, and the operation efficiency can be increased. That is to say, when it is unknown that an optical fiber cable 22 is the used path or the unused path, it can be determined, in a short time, that the optical fiber cable 22 is the used path.

Also, specific configurations can be modified as appropriate, without departing from the gist of the present invention.

REFERENCE SIGNS LIST

20 Optical transmission system
21a, 21b Optical transceiver
22 Optical fiber cable
23 Signal detector
23a Bending unit
23b Detection unit
23c Display unit
24a, 24b Communication terminal device
31 Control unit, Protocol IC unit 31a MAC sub-layer unit
31b PHY unit
31s XGMII signal
32 Signal determination unit
32a TD_snoop_Pin
32b AUX_mod_Pin (out)
32s Determination result signal
33 Optical signal transmission unit
33a AUX_mod_Pin (in)
34 Optical signal receiving unit
35 Optical intensity control unit
36 Serial-parallel conversion unit
37 Laser
P1 Optical signal
A1 Idle signal
OAM signal
D1 Actual data signal

The invention claimed is:

1. An optical transmission system comprising:
a plurality of optical transmission paths through which an Operation Administration and Maintenance (OAM) signal for maintenance and monitoring is transmitted while being superimposed on an optical signal, the plurality of optical transmission paths connecting optical transceivers,
wherein each of the optical transceivers includes a transmission unit configured to transmit the optical signal and a receiving unit, including a circuit, configured to receive the optical signal,
wherein the optical transmission paths include (i) a used path through which an actual data signal from a communication terminal device connected to any of the optical transceivers is transmitted while being superimposed on the optical signal and through which an idle signal in an empty data state that is interposed between intermittent actual data signals is transmitted while being superimposed on the optical signal, and (ii) an unused path through which the actual data signal is not transmitted and the idle signal is transmitted,
wherein the transmission unit of each of the optical transceivers comprises:
a laser configured to emit a laser beam serving as the optical signal; and
an optical intensity control unit, implemented using one or more computing devices, configured to perform control to change an optical level of the optical signal of the laser beam from the laser, and wherein each of the optical transceivers comprises:
a control unit, implemented using one or more computing devices, that is configured to superimpose each of the idle signal, the OAM signal, and the actual data signal on an interface signal for absorbing a difference in communication media, and that is configured to output the interface signal to the transmission unit that transmits the optical signal; and
a signal determination unit, implemented using one or more computing devices, that is configured to determine unique information regarding each of the signals output to the transmission unit and that is configured to output a determination result signal regarding the determination of the unique information,
wherein the optical intensity control unit is configured to perform control, in accordance with a determination state of each signal indicated by the determination result signal, to change the optical level of the optical signal on which a signal of the determination state is superimposed to different levels between signals.

2. The optical transmission system according to claim 1, further comprising a detector that is configured to detect the optical level of the optical signal that is transmitted through any of the optical transmission paths and on which the idle signal is superimposed to detect the idle signal and that is configured to detect that the optical transmission path is the unused path based on a detection time for the idle signal being longer than or equal to a predetermined idle determination time.

3. The optical transmission system according to claim 2, wherein the detector is configured to detect that the optical transmission path is the used path based on the detection time for the idle signal being shorter than the idle determination time.

4. A method for checking an unused path in an optical transmission system that includes a plurality of optical transmission paths through which an OAM signal for maintenance and monitoring is transmitted while being superimposed on an optical signal, the plurality of optical transmission paths connecting optical transceivers, each of the optical transceivers including a transmission unit for transmitting the optical signal and a receiving unit, including a circuit, for receiving the optical signal, the optical transmission paths including (i) a used path through which an actual data signal from a communication terminal device connected to any of the optical transceivers is transmitted while being superimposed on the optical signal and through which an idle signal in an empty data state that is interposed between intermittent actual data signals is transmitted while being superimposed on the optical signal and (ii) an unused path through which the actual data signal is not transmitted and the idle signal is transmitted, the transmission unit of each of the optical transceivers including (i) a laser for emitting a laser beam serving as the optical signal, and (ii) an optical intensity control unit, implemented using one or more computing devices, for performing control to change an optical level of the optical signal of the laser beam from the laser, the method comprising:
superimposing each of the idle signal, the OAM signal, and the actual data signal on an interface signal for absorbing a difference in communication media, and outputting the interface signal to the transmission unit that transmits the optical signal;
determining unique information regarding each of the signals output to the transmission unit, and outputting a determination result signal regarding the determination of the unique information; and
performing control, in accordance with a determination state of each signal indicated by the determination result signal, to change the optical level of the optical signal on which a signal of the determination state is superimposed to different levels between signals.

5. The method according to claim 4, further comprising:
detecting the optical level of the optical signal that is transmitted through any of the optical transmission paths and on which the idle signal is superimposed to detect the idle signal; and
detecting that the optical transmission path is the unused path based on a detection time for the idle signal being longer than or equal to a predetermined idle determination time.

6. The method according to claim 5, further comprising detecting that the optical transmission path is the used path based on the detection time for the idle signal being shorter than the idle determination time.

* * * * *